(12) United States Patent
Vilanova et al.

(10) Patent No.: US 7,118,188 B2
(45) Date of Patent: Oct. 10, 2006

(54) HARDCOPY APPARATUS AND METHOD

(75) Inventors: Ferran Vilanova, Pg.Sant Gervasi (ES); Ramon Borrell, Manresa Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 268 days.

(21) Appl. No.: 10/832,414

(22) Filed: Apr. 27, 2004

(65) Prior Publication Data
US 2004/0252152 A1 Dec. 16, 2004

(30) Foreign Application Priority Data
Apr. 30, 2003 (EP) .................. 03101194

(51) Int. Cl.
*B41J 29/393* (2006.01)
*B41J 2/15* (2006.01)

(52) U.S. Cl. .............. 347/19; 347/40; 347/41
(58) Field of Classification Search .......... 347/19
See application file for complete search history.

(56) References Cited

U.S. PATENT DOCUMENTS

| 6,010,205 A * | 1/2000 | Billet .......................... 347/19 |
| 6,033,137 A | 3/2000 | Ito |
| 6,069,709 A | 5/2000 | Harrington |
| 6,086,181 A | 7/2000 | Majette et al. |
| 6,174,039 B1 | 1/2001 | Takahashi et al. |
| 6,299,284 B1 | 10/2001 | Alfaro |
| 6,375,307 B1 | 4/2002 | Vinals |
| 6,464,332 B1 * | 10/2002 | Silverbrook et al. .......... 347/42 |
| 6,488,351 B1 | 12/2002 | Miller et al. |
| 6,536,869 B1 * | 3/2003 | Bland et al. .................. 347/41 |

FOREIGN PATENT DOCUMENTS

EP   0 727 757   8/1996

OTHER PUBLICATIONS

Patent Abstracts of Japan, vol. 1996:05, May 31, 1996 & JP 08-025693 A (Canon, Inc.), Jan. 30, 1996—abstract only.

* cited by examiner

Primary Examiner—Vip Patel
Assistant Examiner—Jannelle M. Lebron
(74) Attorney, Agent, or Firm—Foley & Lardner LLP

(57) ABSTRACT

In a method of printing with overlapping printhead dies, artifacts in the printed image caused by the printing nozzles in the overlapping region are removed, either by measuring the width of the band produced in the overlapping region and selecting an appropriate depletion or propletion printing mask for subsequent printing operations, or by printing out a test pattern in which areas corresponding to a range of depletion and propletion masks are printed out and the optimal mask is selected for subsequent printing operations. The dies overlap by only a few rows of nozzles. The method may be employed in fixed printhead apparatus (e.g. page wide arrays) or in a scanning printhead apparatus.

19 Claims, 7 Drawing Sheets

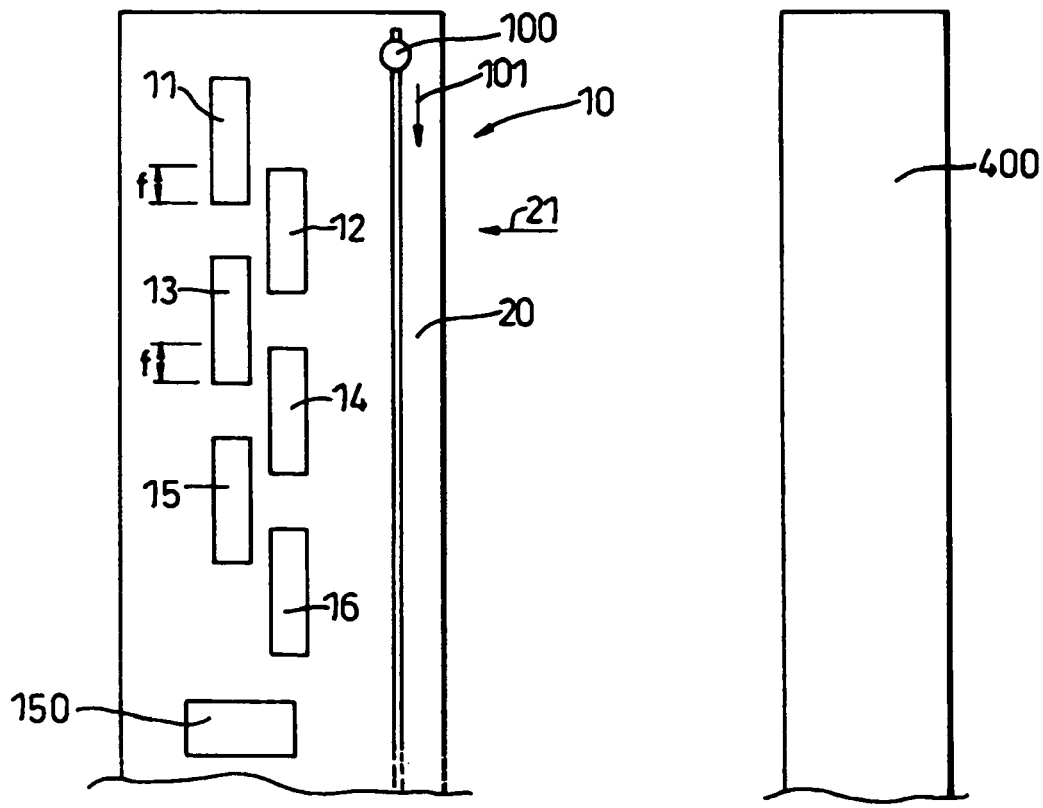
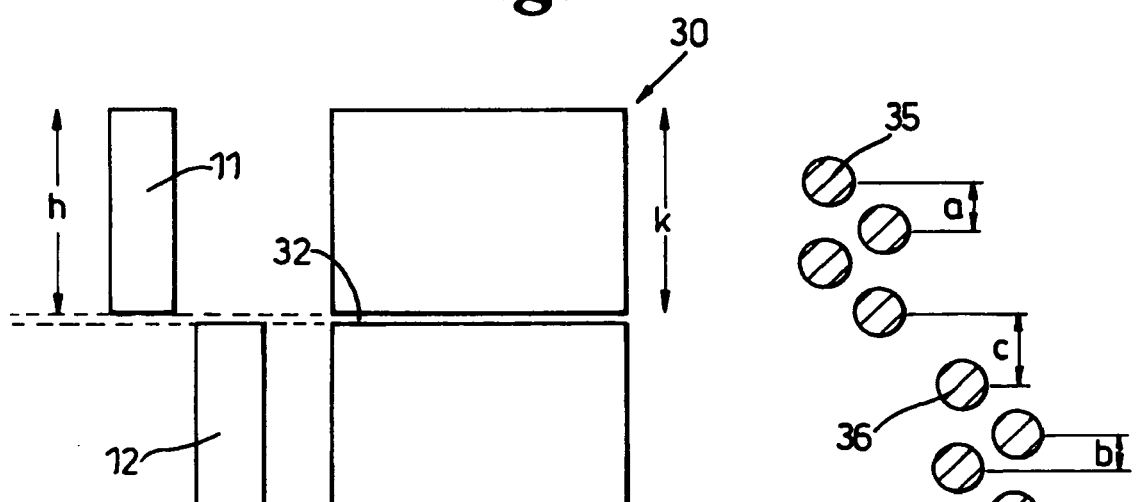
Fig. 1
Fig. 2
Fig. 3

| Overlap (μm) | % of extra ink |
|---|---|
| 5 | 0 |
| 10 | 15 |
| 15 | 30 |
| 20 | 50 |

Regular mask

Fig. 9a

4% Depletion mask

Fig. 9b

12% Depletion mask

Fig. 9c

4% Propletion mask

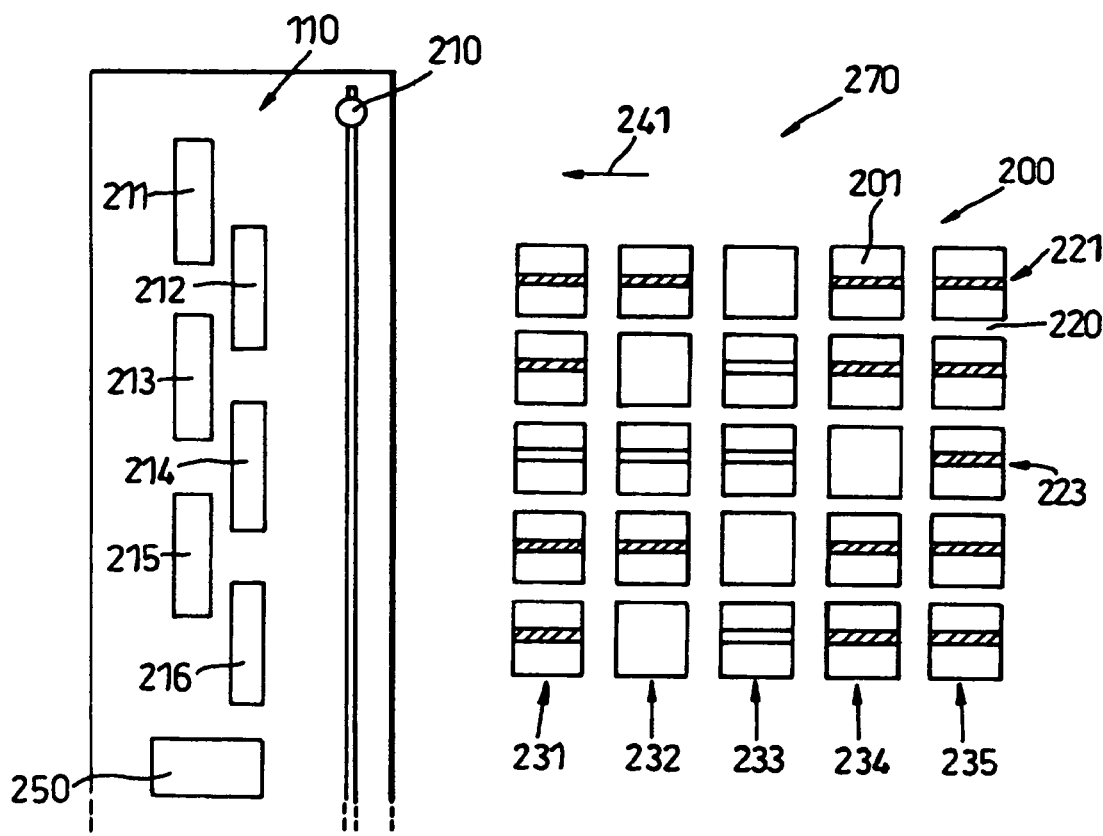
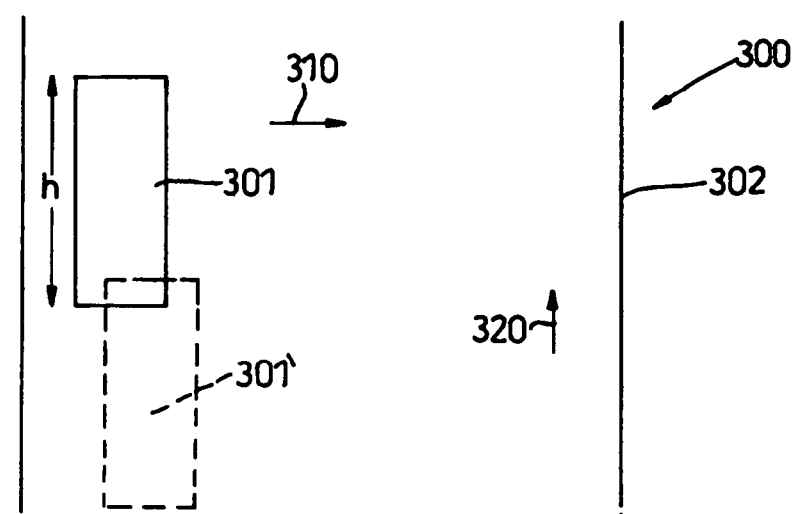
Fig. 10
Fig. 11

HARDCOPY APPARATUS AND METHOD

The present invention relates to printers and other hardcopy apparatus and in particular to apparatus comprising one or more printheads arranged to print swaths of ink on a print medium.

A problem with existing inkjet printhead dies, each comprising a plurality of nozzles arranged substantially in a straight line, is that the nozzles at and adjacent the ends of the die tend to eject ink drops at an angle to a print medium rather than perpendicular thereto as desired.

Accordingly when a plurality of parallel swaths is printed, the problem arises of banding in the regions of the adjacent edges of the swaths.

The Hewlett-Packard DesignJet 750 family of printers attempted to solve this problem by only using the central nozzles of the pen, thus avoiding the use of those with directionality problems. Since the extreme nozzles were not used at all, this produced clogging of these nozzles and deterioration of the reliability of the pen. In particular, since contaminants generally flow to the extreme nozzles actually being used, some of the central nozzles did not fire correctly. As the number of extreme nozzles with directionality problems increased, the portion of the pen actually being used had to become smaller and smaller to achieve satisfactory quality, which had an adverse effect on throughput.

U.S. Pat. No. 6,375,307 discloses a printing apparatus comprising printhead dies in which nozzles corresponding to the overlapping edges of the printed swaths are caused to fire at reduced print densities. The print densities are predetermined. Typically the swaths overlap by an eighth of the swath height corresponding to 64 rows of nozzles out of a typical total of 512 nozzles in a single printhead. With such relatively broad overlaps of swaths, a light band has been found to remain visible in the overlap region.

Japanese Patent 8025693 discloses an inkjet printing method in which printing density is reduced at the edge of a first swath by the application of a random first mask pattern and at the mutually overlapping edge of a second swath by the application of a second mask pattern, which is the reverse of the first mask pattern.

Aspects of the present invention seek to provide a method of printing which improves the removal of artifacts from printed images.

According to a first aspect of the present invention, there is provided a method of printing in a hardcopy apparatus in which relative movement occurs between one or more printhead dies comprising nozzles and a print medium, in which adjacent die positions relative to the medium partially overlap, wherein the nozzles of the die(s), at least in the overlapping regions, are fired to produce a test pattern on the print medium, the test pattern is examined, and the result of the examination is used to produce a printing mask for controlling the firing of the nozzles in the overlapping regions in subsequent printing operations employing the die(s).

An advantage of the above method is that by providing feedback relating to the actual artifact produced in the prevailing printing conditions, it is possible to substantially remove or minimize the artifact at all times.

According to a second aspect of the present invention, there is provided a computer program means arranged to implement methods according to the first aspect.

According to a third aspect of the present invention, there is provider a processor arranged to control printing in a hardcopy apparatus, the processor comprising means for producing relative movement between one or more printhead dies comprising nozzles and a print medium, in which adjacent die positions relative to the medium partially overlap, means for firing the nozzles of the die(s), at least in the overlapping regions, to produce a test pattern on the print medium, means for examining the test pattern, means for using the result of the examination to produce a printing mask, and means for using the printing mask to control the firing of the nozzles in the overlapping regions in subsequent printing operations employing the die(s).

According to a fourth aspect of the present invention, there is provided a hardcopy apparatus comprising one or more printhead dies comprising nozzles, and means for advancing a print medium relative to said die(s), the arrangement being such that adjacent die positions relative to the medium partially overlap, means for causing the nozzles to fire to produce a test pattern on the print medium, and means for controlling the firing of the nozzles in the overlapping regions in subsequent printing operations in dependence on the result of an examination of the test pattern.

The hardcopy apparatus may comprise a plurality of fixed printhead dies and may be of the page wide array type. Alternatively, the hardcopy apparatus may be of the scanning type and comprise one or more printhead dies which are moved in successive scans across a print medium.

The expression "hardcopy apparatus" covers not only printers (e.g. of the ink-jet type) but also photocopiers, scanners and facsimile machines. The "user" of a hardcopy apparatus can be a day-to-day user of the apparatus, or a person repairing or maintaining the apparatus, or someone calibrating the apparatus after manufacture and before use by a customer.

The term "printhead" can be used synonymously with the terms "die" or "module". A "die" typically comprises two mutually staggered rows of nozzles which fire ink or other liquid on to a print medium. A "die" may comprise 512 such nozzles. A module can comprise one or more dies. For modules with more than one die, there are smaller errors and differences between dies in the same module than between dies in adjacent modules.

The liquid fired by the nozzles may be ink. Different dies may fire different coloured inks. Some of the dies may fire a fixer liquid to fix the ink, i.e. to prevent the ink from spreading and/or to improve its visual appearance on the print medium.

A printing mask is a means for selectively masking off certain nozzles, i.e. preventing these nozzles from firing even if printing instructions for those nozzles should include an instruction to fire. It is configured in the control instructions of the hardcopy apparatus.

Preferred embodiments of the present invention will now be described, by way of example only, with reference to the accompanying drawings, of which:

FIG. 1 is a schematic top plan view of a page wide array inkjet printer in accordance with a first embodiment of the present invention;

FIG. 2 is a diagram showing negative overlap between adjacent printing dies;

FIG. 3 is an enlarged view showing an example of negative overlap;

FIGS. 9a to 9e are embodiments of printing masks which are employed to remove the effects of overlaps;

FIG. 10 is a schematic top plan view similar to FIG. 1 of a page wide array printer operating in accordance with a second embodiment of the present invention; and FIG. 11 shows a schematic top plan view of a scanning printer in accordance with a third embodiment of the present invention.

Figure 4:
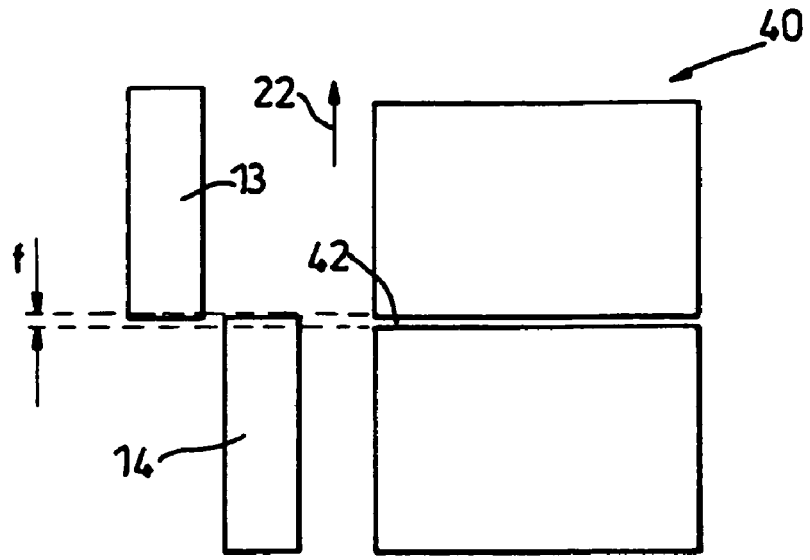
FIG. 4 is a diagram showing positive overlap between adjacent printing dies.

Referring to the drawings, FIG. 1 shows a schematic top plan view of a page wide array inkjet printer 10 in which a fixed array of printheads or printing dies 11 to 16, each comprising two rows of nozzles which are arranged to fire ink drops on to a print medium 20 as it is advanced through the printer in a direction indicated by arrow 21. The operation of the printer 10 is controlled by a processor 150. The overlaps between adjacent dies are shown on an exaggerated scale for the purposes of explanation. The nozzles in each row of nozzles are spaced by 84.66 microns (one three-hundredth of an inch) and the nozzles in the two rows are mutually staggered so that the successive nozzles in each die are spaced by 42.33 microns (one six-hundredth of an inch), 1 micron being equal to 1 micrometer or $10^{-6}$ meters.

FIG. 2 shows an arrangement in which, due to an error in the relative positioning of two of the dies, 11 and 12 say, a light band or gap 32 is produced in the image content 30 printed by the dies 11 and 12 as the print medium 20 advances thereunder. This is called negative overlap. FIG. 3 shows an enlarged view of the ink drops 35,36 printed by the nozzles at the adjacent ends of dies 11 and 12 in the case of negative overlap. The spacing or pitch "a" between the adjacent rows of nozzles in die 11 is 42.33 microns (one six hundredth of an inch) as is the spacing "b" between the adjacent rows of nozzles in die 12. However, the spacing "c" between the end nozzles of die 11 and the nearest nozzle of die 11 is greater than 42.33 microns (one six hundredth of an inch) leading to the appearance of gap 32.

Figure 5:
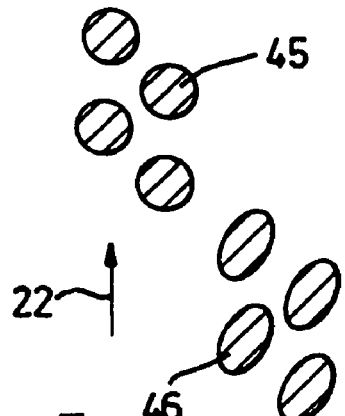
FIGS. 5 and 6 are enlarged views showing examples of positive overlap.

FIG. 4 shows an arrangement in which, due to an error in the relative positioning of the dies, 13 and 14 say, a dark band 42 is produced in the image content 40 printed by the dies 13 and 14 as the print medium 20 advances thereunder. This is called positive overlap. FIG. 5 shows an enlarged view of the ink drops 45,46 printed by the nozzles at the adjacent ends of dies 13 and 14 respectively in the case of positive overlap. Positive overlap is said to exist not only where the ink drops actually overlap in the direction 22 perpendicular to the medium advance but also into the case where the distance between the end nozzles of die 13 and the nearest nozzle of die 14 is less then 42.33 microns (one six hundredth of an inch).

Figure 6:
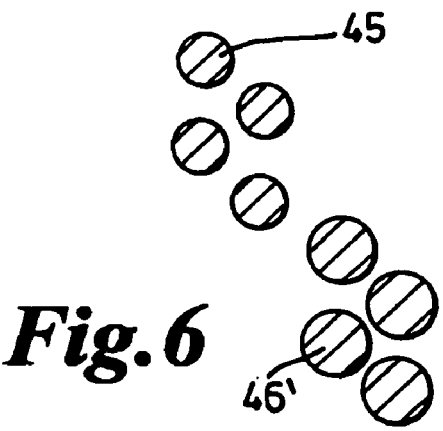

Positive overlap can occur even when, as in FIG. 3, all the ink drops are precisely circular. As shown in FIG. 5, the shape of drops 46 is not quite circular and this has an additional influence on the effective positive overlap between dies 13 and 14. In FIG. 6, the size of the drops 46' printed by the nozzles of the end of die 14 (also known as the "drop weight") is larger than that of drops 45 and this has an additional influence on the effective positive overlap between dies 13 and 14. Even if the spacing between the end nozzles of die 13 and the end nozzles of die 14 has the desired value of 42.33 microns (one six hundredth of an inch), incorrectly shaped (FIG. 5) and/or sized (FIG. 6) ink drops can produce similar effects as incorrect overlap, which can be corrected, at least partly, by arrangements and methods in accordance with the present invention.

There is an additional factor which has an effect on the width of the gap 32 or the band 42 and this is known as "swath height error" or SHE. SHE is explained in U.S. Pat. No. 6,375,307 and arises when the height "h" of the die (i.e. its long dimension) is not equal to the corresponding dimension "k" of the image content actually printed. These dimensions are shown in FIG. 2. When the end nozzles of a die eject ink drops in a direction away from the central nozzles of the die, the printed swath height is greater than the theoretical swath height (i.e. as measured on the die itself) and this is known as positive SHE. When the end nozzles of a die eject ink drops in a direction towards the central nozzles of the die, the printed swath height is less than the theoretical swath height, and this is known as negative SHE.

With a view to overcoming the presence of visible gaps or bands in the printed image despite all the above problems, the dies of the printer 10 are deliberately set with a small overlap "f" (which has been shown in exaggerated manner in FIG. 1 for the purposes of explanation). By "small" is meant a dimension corresponding to no more than a few times the nozzle spacing. In the preferred embodiment of FIG. 1, the dimension "f" corresponds to twice the nozzle spacing, i.e. 84.66 microns (one three hundredth of an inch). In another preferred embodiment the dimension "f" is equal to one and a quarter times the nozzle spacing i.e. 52.91 microns (one four hundred and eightieth of an inch).

As a result of the redundancy of nozzles in the region where adjacent dies overlap, this gives flexibility for compensating for gaps 32 or band 42 produced by inaccuracies in locating the dies and thus in setting the dimension "f", and the additional problems caused by swath height error. Although, in an ideal case, 100% of the required amount of ink (maximum) would be printed by only 50% of the nozzles of each die in the overlap region, in practice more or fewer of the nozzles may be fired to compensate for imperfections. For example if the overlap is less than "f" it is still possible to avoid the production of a gap by firing some of the nozzles which would not be fired in the ideal case.

A method of adding printing masks to the printed image content in accordance with a first embodiment of the present invention will now be described with reference to the flow diagram 70 of FIG. 7. Because of the particular pattern of nozzles to fire defined by the masks, they are also known as "stitching" or "weaving" masks. In a first step 71, substantially all the nozzles of all the dies 11 to 16 in FIG. 1 are fired to print their normal patterns on a print medium sheet. The image contents 30 and 40 of FIGS. 2 and 4 may be used as test patterns for this purpose. In step 72, the widths of the bands 32 or 42 (corresponding generally to the overlaps "f" between successive respective pairs of dies 11,12; 12,13 etc.) are then measured in μm, i.e. microns.

The measurement may be effected manually, with the aid of the eye. Firstly, it is determined whether a band exists in the overlapping region and, if so, whether it is a light band (gap) or a dark band. The width of the band is then measured by the user. Alternatively, the measurement of the widths may be undertaken automatically by an optical sensor 100 which is movably mounted on the printer and scans across the overlapping regions in the direction of arrow 101.

For the reasons stated above, the magnitude of the overlap will vary from the nominal value "f". The amount of extra ink produced is than calculated in step 74 from a look-up table 80, FIG. 8, which has been previously determined empirically. It will be noted that there is a substantially linear relationship between the overlap, in μm, and the percentage of extra ink printed. As a final step 75, the stitching mask is added to or superimposed on the printing masks, the resulting combination being used when printing an image.

Figures 9A, 9B:
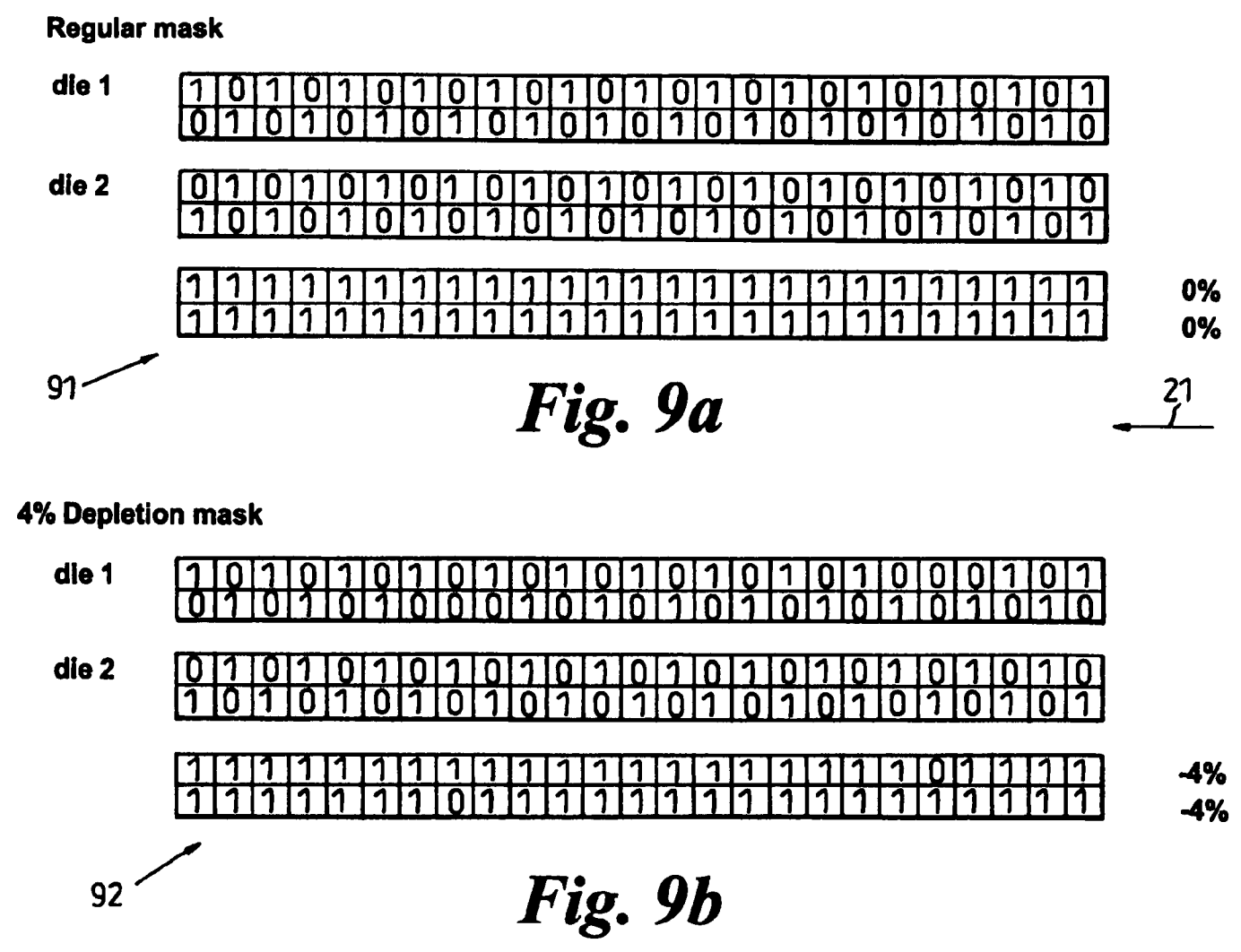

FIG. 9 shows the ink fired by the nozzles in the two end rows of two adjacent dies identified as a first die (die 1) and a second die (die 2). A numeral 1 in a box indicates that the individual nozzle is fixed to produce its maximum (100%) amount of ink. A numeral 0 in a box indicates that the nozzle is not fired. The third line shows the result of the addition of the two die masks in the preceding lines. It will be seen that the masks resemble stitching patterns. The nozzles fire on a print medium as it moves thereunder in the direction of arrow 21. Alternatively, the horizontal axis can be viewed as the time axis, since successive boxes indicate the firing status of an individual nozzle at successive points in time. FIG. 9a shows a so-called "regular" mask 91 that assumes precise overlapping of the two rows of the first and second dies.

Figures 9C, 9D:
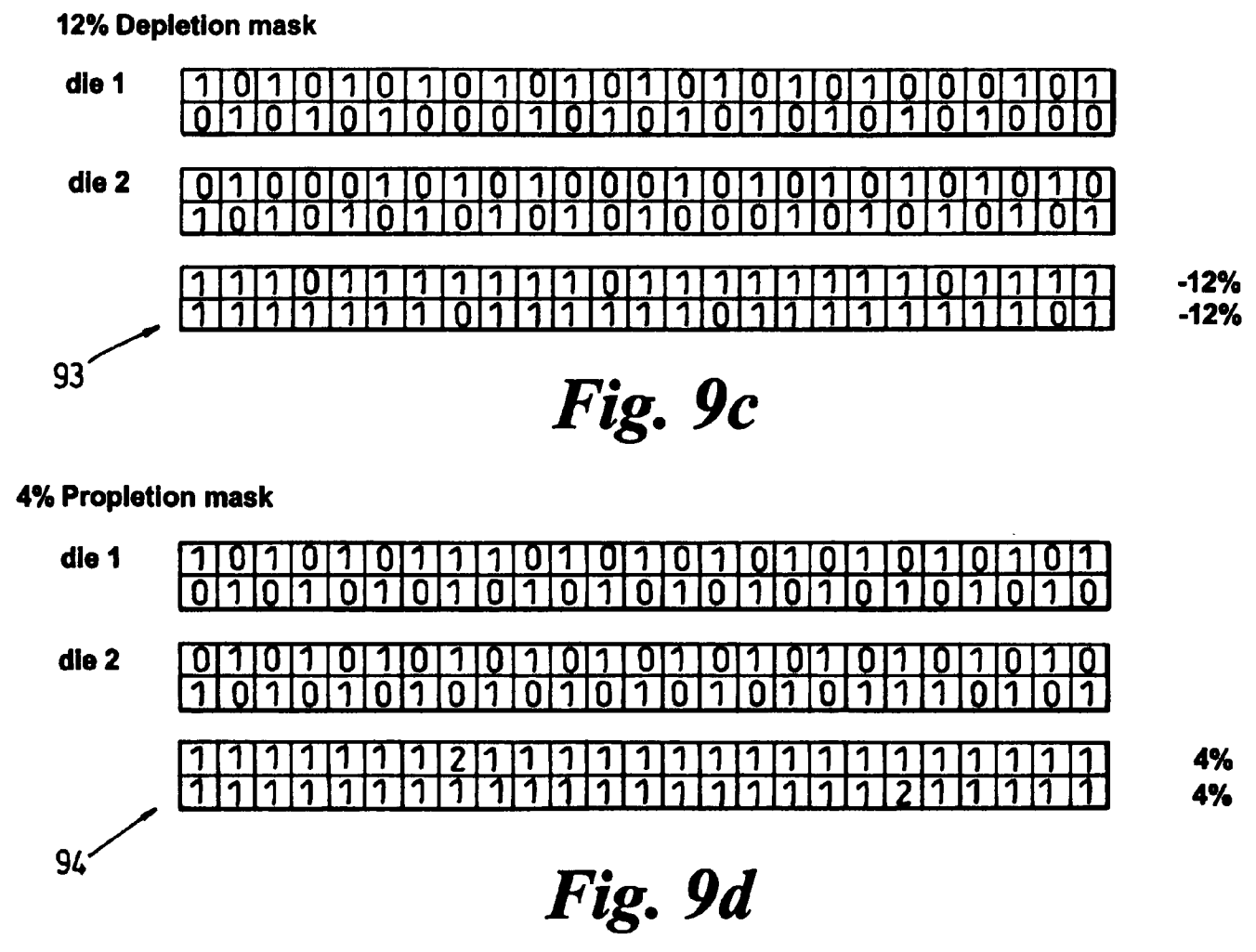

The nominal amount of ink printed by the nozzles of each due in the overlap region is 50% (e.g. half the nozzles of each die fire a full drop of ink). To reduce the extra ink which is found to be produced when the overlap exceeds 5 µm, the percentage of nozzles of each die in the overlap region is lowered to compensate for the extra ink shown in FIG. 8. This process is known as "depletion". The mask shown in FIG. 9b shows a 4% depletion mask 92, in which 4% (i.e. one in 25) of the nozzles which fire in the regular mask 91 are turned off. The mask shown in FIG. 9c shows a 12% depletion mask 93, in which three in every twenty five of the nozzles which fire in the regular mask 91 are turned off.

Figure 9E:
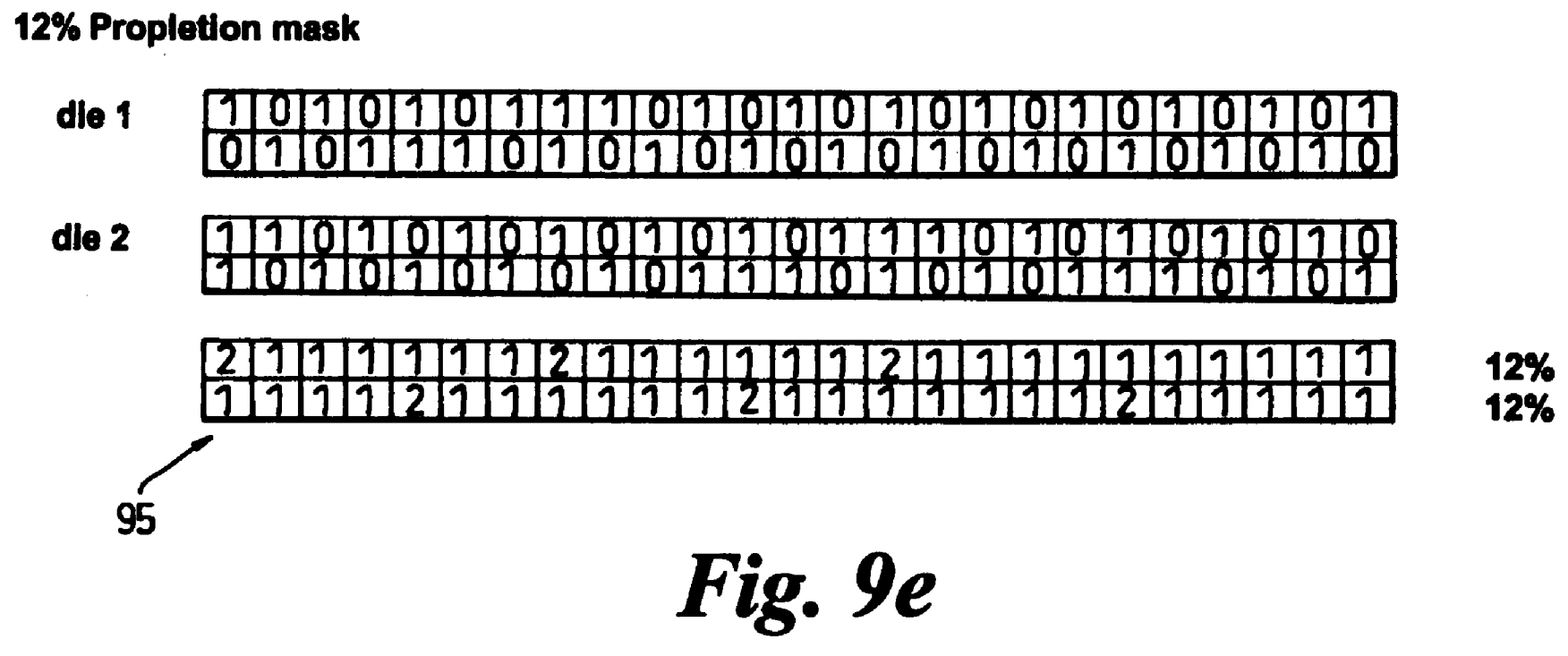

If the overlap of adjacent dies is less than the nominal amount, then a light gap appears in the printed image content and in this case it is necessary to raise the percentage of nozzles of each die firing in the overlap region to increase the amount of ink produced. This process is known as "propletion". The mask shown in FIG. 9d shows a 4% propletion mask 94, in which 4% (i.e. one in 25) of the nozzles which do not fire in the regular mask 91 of FIG. 9a, do fire in FIG. 9d. It will be seen that at certain locations on the print medium an amount of ink is deposited corresponding to twice the maximum amount which can be produced by an individual nozzle. FIG. 9e shows a 12% propletion mask 95 in which three in every twenty five of the nozzles which do not fire in the regular mask 91, do fire in FIG. 9e.

It will be noted that, once the required depletion or propletion percentage value has been derived from the look-up table 80, the designs of the print masks 91 to 95 are used to disperse these values so that the effects of the boundaries between dies are invisible to the eye in printed images.

The resulting depleted or augmented mask is combined in a logical AND relationship with the printing mask which is in turn combined in AND relationship with the image content at each location, i.e. the signals supplied to the dies relating to the image or other content to be printed. This ensures that the required correction is made independently of the content to be printed.

The above described arrangement has various advantages. In particular the application of the printing masks shown in FIG. 9 enables the artifacts caused by the die boundaries to be removed. The "missing" or "extra" ink drops are distributed between both dies of each overlapping pair. If one or more nozzles in the overlapping regions are defective, the arrangement automatically compensates for this by increasing the ink fired by adjacent nozzles.

In addition, the printing masks used are binary masks with two levels "0" and "1" corresponding to "off" and "on". This enables a relatively simple nozzle-control system to be employed. It will be noted that this still permits areas with "double" dots to be obtained by the addition of two "1"s from nozzles on adjacent dies. Multi-level half-toning, which is relatively complicated, it not needed.

Since there is an overlap of only two rows of nozzles, nearly all the nozzles of each die are fully used, which constitutes an efficient use of resources.

The above-described calibration method and apparatus may be applied to a single colour or multi-colour printer. For multi-colour printers, the printheads of each colour are calibrated separately and the sets of masking data are stored for subsequent printing operations. The imperfections causing the banding in the printed image content may drift over time, so re-calibration may be undertaken at regular intervals. The overlap of the dies may vary with temperature, and since the temperature of the printheads may vary in dependence upon the particular printing mode being performed, a separate calibration process can be undertaken corresponding to each printing mode. For example different calibration processes can be undertaken for printing line drawings and for printing graphics images.

Figures 7, 8:
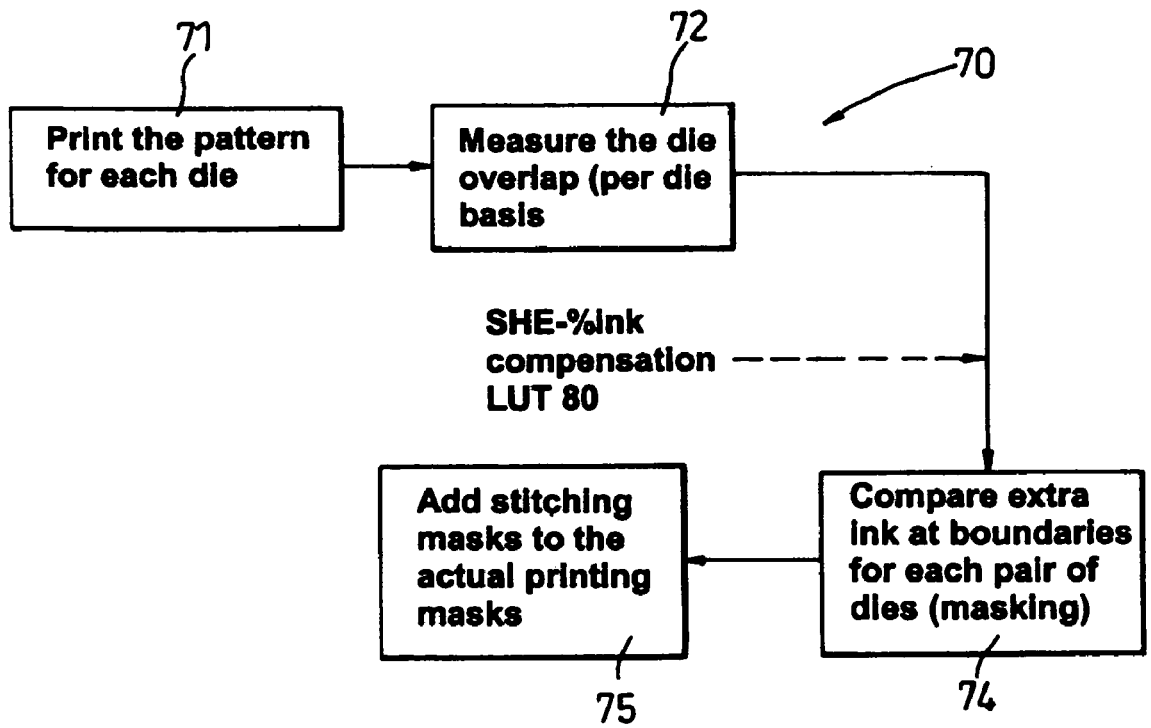
FIG. 7 is a flow diagram showing how printing masks are applied to printed images in a first method in accordance with the present invention.
FIG. 8 is a look-up table (LUT) which relates the overlap of adjacent printhead dies to the amount of extra ink which is printed in the overlap region.

In other modifications, the look-up table in FIG. 8 may be expanded to cover all probable die overlaps. Similarly the range of the printing masks may extend from 20% depletion to 20% propletion. The individual masks in the range are preferably spaced from their neighbours by a 4% difference. However, the spacings may be from 1% to 5% corresponding to a total of 42 separate printing masks or 9 separate printing masks respectively, corresponding to a total range of −20% to +20%.

Although in the masks shown in FIG. 9 the missing or extra ink drops are provided at regular intervals in time (i.e. at regular intervals along the print medium in the direction of medium advance), these drops could be distributed at random provided the overall percentage remained essentially the same.

Adjacent dies in the printer may overlap by more than or less than two rows and the overlap may be fractional. The printing masks in FIG. 9 are amended as necessary. The preferred range of overlap is up to 3 rows of nozzles, i.e. up to 127 microns (one two hundredth of an inch) more preferably 1 to 2½ rows, i.e. 42.33 microns (one six hundredth of an inch) to 105.8 microns (one two hundred and fortieth of an inch) and most preferably 1¼ to 2 rows i.e. 52.91 microns (one four hundred and eightieth of an inch) to 84.66 microns (one three hundredth of an inch).

There may be cases where the alignment of the dies has a relatively large tolerance range so that the die overlap may exceed the size of the number of nozzle rows for which stitching masks are provided. In these cases, steps 72 and 74 of the method of FIG. 7 may be separated by a further step which decides to which row of nozzles the stitching masks are to be applied. Where there is a sufficiently large die overlap, end rows of nozzles may not be fired at all.

Instead of the optical sensor 100 on the printer, a separate high resolution scanner 400, FIG. 1, external to the printer, may be used to detect the widths of bands 32, 42 in the automatic mode described above.

An alternative way of calibrating the printer by selecting the particular mask to employ will now be described in connection with FIG. 10. As in FIG. 1, the overlaps between adjacent dies are shown on an exaggerated scale. In a first step the printer 110 prints an array 200 of so-called target areas 201 on a print medium 270 by the dies 211–216. The areas comprise mid tone area fills (patches of 50% density) in which for each patch the top half is printed by one die and the bottom half by the adjacent die. The nozzles in the central region of each die are not fired during this step leaving gaps 220.

It will be seen that the areas in row 221 are printed by the nozzles in and near the overlapping regions of dies 211 and 212. The areas in column 231 are printed with the regular mask 91 of FIG. 9a being applied to the nozzles in the end two rows of each die. The areas in columns 232,233,234, and 235 respectively correspond to a depletion mask of 4%, a depletion mask of 8%, a propletion mask of 4% and a propletion mask of 8% being applied to the same nozzles. A wider range of depletion and propletion masks may be printed out ranging from 0% to 20%.

In a second step, the magnitudes of the die-die boundary artefacts are then assessed. This may be performed by a user of the machine or automatically by an optical sensor/scanner system. In the first option, a user visually examines the patches in each row and selects the one with the better area fill uniformity at the printed region corresponding to the die-die boundary. The corresponding mask is then applied to that die-die boundary in subsequent normal printing operations.

In the actual example of FIG. 10, it will be seen that the area in row 221 which has the best appearance is that in column 233 (i.e. with 8% depletion). Any mask with less depletion or no depletion produces a dark band in the target areas 201 in that row. In row 233, however, it is the area in column 234 which has the best appearance (i.e. with 4% propletion). Any mask with less propletion or no propletion produces a gap in the target areas 201 in that row. The optimal target area 201 is similarly selected for each of the other rows, and used in subsequent printing operations.

In the second option, an optical sensor moves over all the patches detecting the boundary artifact level and supplies the most appropriate depletion/propletion mask for each die pair to a printer control system. These masks will then be used for normal printing operations. An optical sensor moving in two dimensions over the patches may be employed. Alternatively, an optical sensor 210 moving in one dimension (like sensor 100 in FIG. 1) may be employed, in which case the print medium 270 carrying the array 200 of areas needs to be moved in the direction of arrow 241 in a co-ordinated manner during the scanning process. The operations of the printer 110 are controlled by a processor 250.

The number of areas or patches printed in area 200 may be increased to increase the ranges of depletion and propletion covered and/or the resolution between adjacent patches in the same row. Thus values up to 20% depletion and propletion may be covered, and the differences between adjacent areas in the same row may correspond to any value between 1% and 5%.

The same modifications may be applied to the method and apparatus described in connection with FIG. 10 as in connection with the preceding figures. Whether the stitching masks are selected visually or, by means of a sensor, automatically, the effects of differences between adjacent dies (e.g. differences in drop weight as discussed in connection with FIG. 6) are reduced by selection of masks which hide the artifacts in optimal manner.

Methods according to the invention can be conveniently implemented by computer program means.

Although described above in connection with page-wide arrays and fixed printheads, methods according to the invention may alternatively be applied to scanning printers, such as disclosed in U.S. Pat. No. 6,299,284. The printhead or die 301 of the scanning printer 300 shown in FIG. 11, prints successive swaths in scanning direction 310 on a print medium 302. Between scans of the die 301 across the print medium, the print medium is advanced in a direction 320 by a distance slightly less than the height "h" of the die itself. Thus during the next scan of die 301 it will move over the print medium 302 to print a swath aligned with the box 301' indicated in broken lines, representing the next position of the die. It will be appreciated, however, that it is the print medium which has moved in direction 320 and not the die 301. To produce a test pattern, the die 301 is moved across the print medium at least twice, which results in an image similar to pattern 30 of FIG. 2 or pattern 40 of FIG. 4. The image can be analyzed visually by a user, or automatically as in the previously-described examples.

Printing masks similar to those shown in FIG. 9 are applied to the nozzles in the overlapping end rows of the printhead 301 as the printhead travels across the print medium 302 in each swath. As described in connection with the page-wide array embodiment, a separate calibration can be undertaken in a colour printer for each colour printhead.

The invention claimed is:

1. A method of printing in a hardcopy apparatus in which relative movement occurs between one or more printhead dies comprising nozzles and a print medium, in which adjacent die positions relative to the medium partially overlap, wherein the nozzles of the die(s), at least in the overlapping regions, are fired to produce a test pattern on the print medium, the test pattern is examined, and the result of the examination is used to produce a printing mask for controlling the firing of the nozzles in the overlapping regions in subsequent printing operations employing the die(s), wherein the examination of the test pattern comprises measuring the width of an artifact therein caused by the overlapping region.

2. A method according to claim 1, wherein the width is measured by a user of the hardcopy apparatus.

3. A method according to claim 1, wherein the width is measured by an optical sensor/scanner.

4. A method according to claim 1, comprising preparing a look-up table which relates the size of the overlapping region as indicated by the size of said artifact to the change in the amount of ink required to remove said artifact from the region, and using said look-up table to produce said printing mask which is arranged to effect said change.

5. A method according to claim 4, wherein the printing mask used is selected from a plurality of printing masks which, starting from a nominal mask, range between reducing the number of nozzles fired in the overlapping region by up to 20% and increasing the number of nozzles fired in the overlapping region by up to 20%.

6. A method according to claim 4, wherein the printing mask is selected from a plurality of printing masks which differ from each other by 1% to 5% of the number of nozzles fired in the overlapping region.

7. A method according to claim 1, wherein the nozzles of the die(s) are fired to produce a test pattern which includes a plurality of test areas on the print medium, each test area being printed with a different printing mask, and the examination of the test pattern comprises identifying the test area in said plurality which has no artifact or a minimum artifact, and using the printing mask corresponding to said identified test area in subsequent printing operations.

8. A method according to claim 7, wherein test area identification is effected visually by a user.

9. A method according to claim 7, wherein test area identification is effected by an optical sensor/scanner.

10. A method according to claim 1, wherein the hardcopy apparatus comprises a plurality of fixed printhead dies extending in mutually overlapping arrangement across a print medium, which is arranged to move relatively thereto, the nozzles of each mutually adjacent pair of dies being fired to produce a respective test pattern.

11. A method according to claim 1, wherein the hardcopy apparatus comprises at least one printhead die which undertakes successive scanning passes in a scanning direction relative to a print medium to print swaths thereon, the print medium, between said passes, undertaking movements in a medium advance direction perpendicular to said scanning direction, wherein said test pattern comprises the overlapping region of the two successive printed swaths.

12. A method according to claim 1 wherein the printing masks for the nozzles of each die is a binary mask comprising an array of solely the binary values "1" and "0".

13. A computer program means arranged to implement the method according to claim 1.

14. A method of printing in a hardcopy apparatus in which relative movement occurs between one or more printhead dies comprising nozzles and a print medium, in which adjacent die positions relative to the medium partially overlap, wherein the nozzles of the die(s), at least in the overlapping regions, are fired to produce a test pattern on the print medium, the test pattern is examined, and the result of the examination is used to produce a printing mask for controlling the firing of the nozzles in the overlapping regions in subsequent printing operations employing the die(s), wherein the overlap between adjacent die positions corresponds to up to three nozzle spacings.

15. A processor arranged to control printing in a hardcopy apparatus, the processor comprising means for producing relative movement between one or more printhead dies and a print medium, in which adjacent die positions relative to the medium partially overlap, means for firing the nozzles of the die(s), at least in the overlapping regions, to produce a test pattern on the print medium, means for examining the test pattern, means for using the result of the examination to produce a printing mask, and means for using the printing mask to control the firing of the nozzles in the overlapping regions in subsequent printing operations employing the die(s), wherein the examination of the test pattern comprises measuring the width of an artifact therein caused by the overlapping region.

16. A hardcopy apparatus according to claim 15 and further comprising an optical sensor/scanner for examining the test pattern.

17. A hardcopy apparatus comprising one or more printhead dies comprising nozzles, and means for advancing a print medium relative to said die(s), the arrangement being such that adjacent die positions relative to the medium partially overlap, means for causing the nozzles to fire to produce a test pattern on the print medium, and means for controlling the firing of the nozzles in the overlapping regions in subsequent printing operations in dependence on the result of an examination of the test pattern, wherein the examination of the test pattern comprises measuring the width of an artifact therein caused by the overlapping region.

18. A hardcopy apparatus according to claim 17, comprising a plurality of fixed printhead dies extending in mutually overlapping arrangement across the print medium.

19. A hardcopy apparatus according to claim 17, comprising at least one printhead die, means for causing said die to undertake successive passes in a scanning direction relative to the print medium, and means for causing the print medium to undertake, between said passes of the printhead die, advance movements in a direction perpendicular to the scanning direction.

\* \* \* \* \*